United States Patent
Heo

(10) Patent No.: US 7,667,772 B2
(45) Date of Patent: Feb. 23, 2010

(54) VIDEO PROCESSING APPARATUS AND METHOD

(75) Inventor: Hye-Hyun Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 666 days.

(21) Appl. No.: 11/312,717

(22) Filed: Dec. 21, 2005

(65) Prior Publication Data

US 2007/0024747 A1 Feb. 1, 2007

(30) Foreign Application Priority Data

Jul. 27, 2005 (KR) .................. 10-2005-0068509

(51) Int. Cl.
*H04N 7/01* (2006.01)

(52) U.S. Cl. .................................... 348/448

(58) Field of Classification Search .......... 348/448, 348/441, 451, 452, 458, 459; *H04N 7/01*, *H04N 11/20*

See application file for complete search history.

(56) References Cited

U.S. PATENT DOCUMENTS 6,108,047 A * 8/2000 Chen .................... 348/448
6,118,486 A * 9/2000 Reitmeier ............... 348/441
6,392,706 B1 5/2002 Sugiyama
2002/0060746 A1 5/2002 Yugami

FOREIGN PATENT DOCUMENTS

| JP | 07-099635 | 4/1995 |
|----|-----------|--------|
| JP | 2000-115722 | 4/2000 |
| KR | 10-0252988 | 1/2000 |
| WO | WO 01/15442 A1 | 3/2001 |

\* cited by examiner

*Primary Examiner*—Sherrie Hsia
(74) *Attorney, Agent, or Firm*—Roylance, Abrams, Berdo & Goodman, L.L.P.

(57) ABSTRACT

A video processing apparatus and method are disclosed. The video processing apparatus includes a first de-interlacer to de-interlace standard definition (SD)-level interlaced video signal into an SD-level progressive video signal by using spatial-temporal interpolation and output the SD-level progressive video signal, a scaler to convert the SD-level progressive video signal into a high definition (HD)-level interlaced video signal and output the HD-level interlaced video signal, and a second de-interlacer to de-interlace the HD-level interlaced video signal into a HD-level progressive video signal by using spatial interpolation and output the HD-level progressive video signal. Accordingly, an artifact ca be prevented from appearing at a vertical edge of an image.

9 Claims, 3 Drawing Sheets

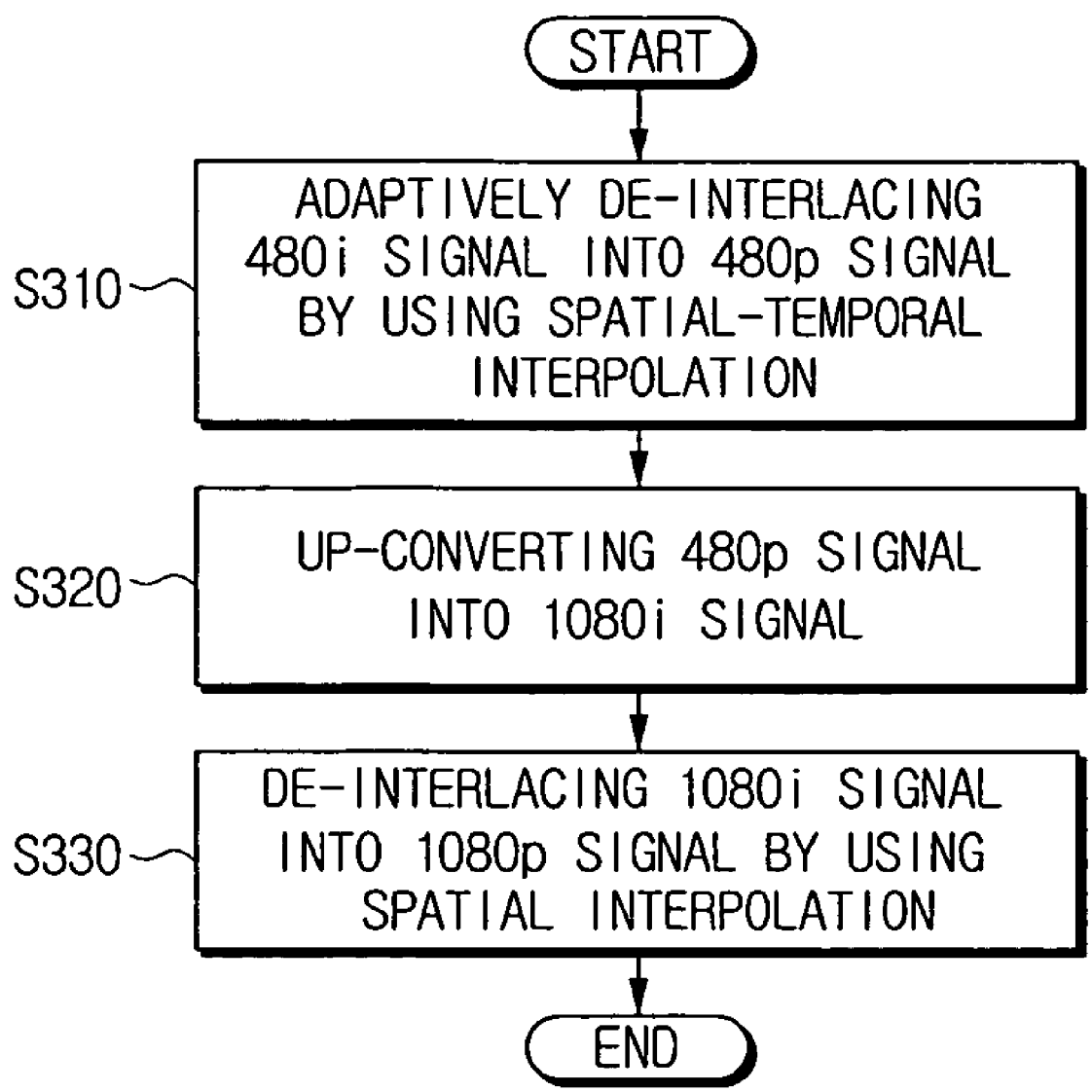

VIDEO PROCESSING APPARATUS AND METHOD

PRIORITY

This application claims the benefit under 35 U.S.C. § 119(a) of Korean Patent Application No. 2005-68509, filed Jul. 27, 2005, the entire content of which is hereby incorporated by reference.

BACKGROUND OF THE INVENTION

1. Field of the Invention

The present invention relates to a video processing apparatus and method. More particularly, the present invention relates to a video processing apparatus and method for preventing an artifact from appearing at a vertical edge of an image when de-interlacing a standard definition (SD)-level video signal into a high definition (HD)-level video signal.

2. Description of the Related Art

Two different scanning methods are available to render an image—interlaced scanning and progressive scanning or non-interlaced scanning. Interlaced scanning is mainly used for general TV, and it divides a single image frame into two fields and then alternately displays the two fields, thereby displaying one picture. The two fields are called 'top' and 'bottom' fields, 'upper' and 'lower' fields, or 'odd' and 'even' fields.

Progressive scanning is mainly used for computer monitors or digital TV, and it displays the entire picture frame by frame as if a film is projected onto a screen.

A de-interlacer converts an interlaced video signal into a progressive video signal. Therefore, a progressive display device for processing a progressive video signal requires a de-interlacer in order to process an interlaced video signal.

For example, if a viewer wishes to view an SD-level video signal, for example, a 480$i$ signal, through an HD-level display device, such as a 1080$p$ panel, two times de-interlacing operations are required to up-convert the SD-level 480$i$ video signal into the HD-level 1080$p$ video signal.

The above-described signal processing process will be described in detail below.

FIG. 1 is a flowchart illustrating a conventional signal processing method for displaying an SD-level video signal on an HD-level display device.

Referring to FIG. 1, a first de-interlacer de-interlaces an incoming 480$i$ signal into a 480$p$ signal at operation S10. The first de-interlacing applies adaptive de-interlacing that is realized by temporal-spatial interpolation.

Next, the 480$p$ signal is up-converted into a 1080$i$ signal and the 1080$i$ signal is output at operation S20. The operations S10 and S20 are performed on a single chip.

Next, a second de-interlacer de-interlaces the 1080$i$ signal into a 1080$p$ signal at operation S30. The second de-interlacing also applies adaptive de-interlacing that is realized by temporal-spatial interpolation.

However, the two times de-interlacing operations for converting the SD-level video signal 480$i$ into the HD-level video signal 1080$p$ result in an artifact appearing at the vertical edge of an image. This distortion is especially prevalent around horizontal images such as eyes or cross stripe clothing. The artifact appears on the screen as a horizontal dot line.

SUMMARY OF THE INVENTION

The present invention has been developed in order to solve the above problems in the related art. Accordingly, an aspect of the present invention is to provide a method and apparatus for preventing an artifact from appearing at the vertical edge of an image when de-interlacing an SD-level video signal into an HD-level video signal.

The above aspect is achieved by providing a video processing apparatus comprising a first de-interlacer to de-interlace a standard definition (SD)-level interlaced video signal into a SD-level progressive video signal by using spatial-temporal interpolation and output the SD-level progressive video signal, a scaler to convert the SD-level progressive video signal into a high definition (HD)-level interlaced video signal and output the HD-level interlaced video signal, and a second de-interlacer to de-interlace the HD-level interlaced video signal into a HD-level progressive video signal by using spatial interpolation and output the HD-level progressive video signal.

The spatial interpolation preferably comprises one of three methods: line repetition, intra-field interpolation, and inter-field interpolation. The line repetition method simply repeats the line information of a current field, the intra-field interpolation method inserts an average value of two lines of a current field between the two lines, thereby producing a new field, and the inter-field interpolation method inserts a previous line and a next line between lines of a current field.

The spatial-temporal interpolation preferably extracts motion information between a previous field and a next field with reference to a current field, adaptively combines the output of the spatial interpolation and the output of the temporal interpolation based on the extracted motion information, and outputs the combined output.

The temporal interpolation is preferably performed by inserting lines of a previous field and a next field between lines of a current field.

The first de-interlacer and the scaler are preferably integrated into a single chip.

The above aspects can be achieved by providing a video processing method comprising de-interlacing an SD-level interlaced video signal into an SD-level progressive video signal by using spatial-temporal interpolation and outputting the SD-level progressive video signal, converting the SD-level progressive video signal into an HD-level interlaced video signal and outputting the HD-level interlaced video signal, and de-interlacing the HD-level interlaced video signal into an HD-level progressive video signal by using spatial interpolation and outputting the HD-level progressive video signal.

The spatial interpolation preferably comprises one of three methods: line repetition, intra-field interpolation, and inter-field interpolation. The line repetition method simply repeats the line information of a current field, the intra-field interpolation method inserts the average value of two lines of a current field between the two lines, thereby producing a new field, and the inter-field interpolation method inserts a previous line and a next line between lines of a current field.

The spatial-temporal interpolation preferably extracts motion information between a previous field and a next field with reference to a current field, adaptively combines the output of the spatial interpolation and the output of a temporal interpolation based on the extracted motion information, and outputs the combined output.

The temporal interpolation is preferably performed by inserting lines of a previous field and a next field between lines of a current field.

BRIEF DESCRIPTION OF THE DRAWINGS

The above aspects and features of the present invention will become more apparent from the following description of certain exemplary embodiments of the present invention, taken in conjunction with the accompanying drawings, in which:

FIG. 3 is a flowchart illustrating a video processing method according to an exemplary embodiment of the present invention.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Figure 1:
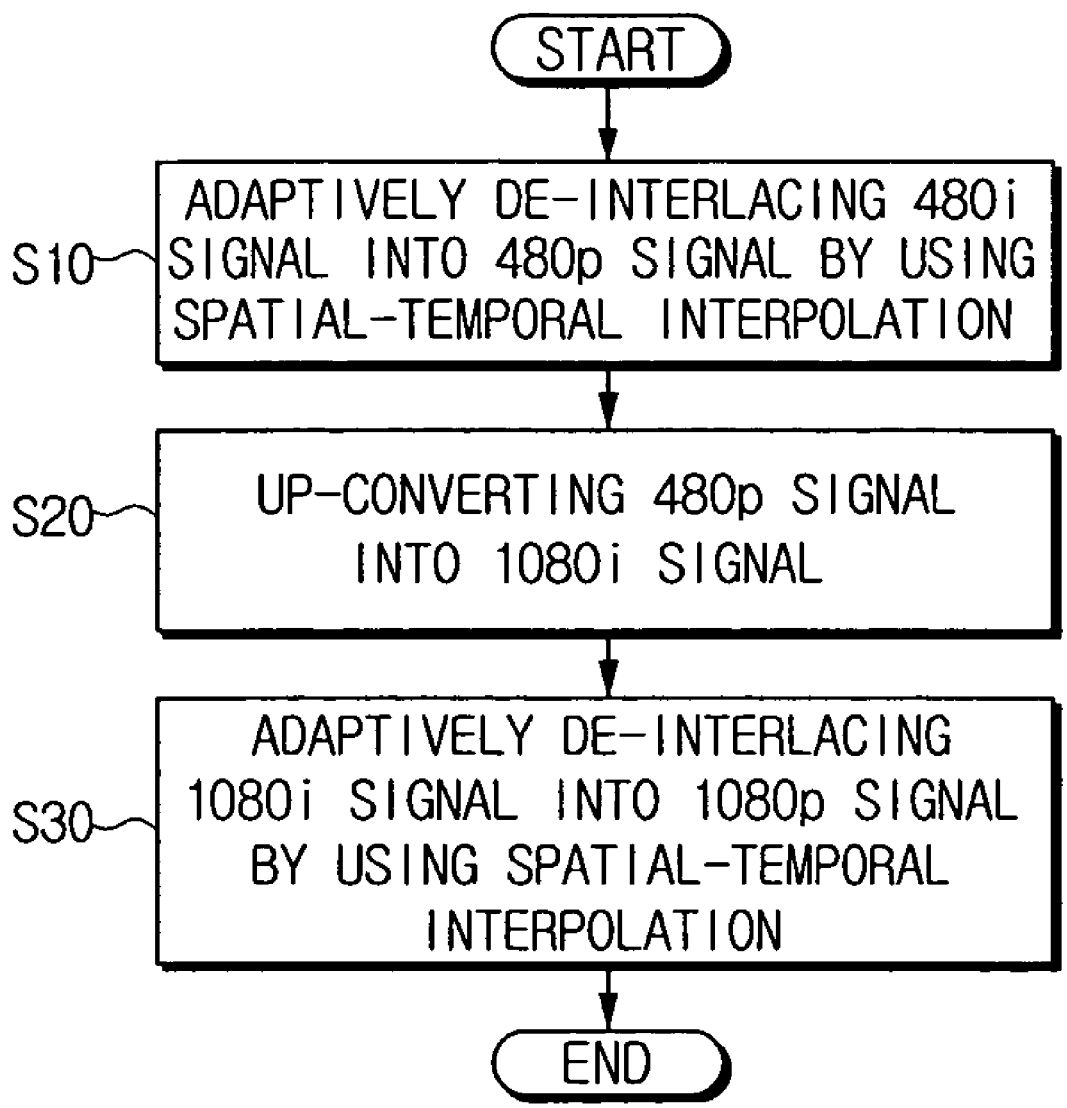
FIG. 1 is a flowchart illustrating a conventional signal processing method for displaying an SD-level video signal on an HD-level display device.
Figure 2:
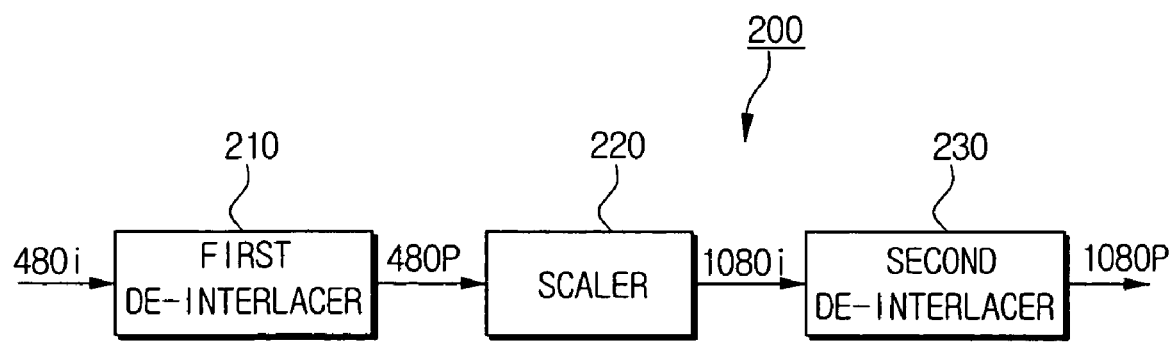
FIG. 2 is a block diagram illustrating a video processing apparatus according to an exemplary embodiment of the present invention.

FIG. 2 is a block diagram illustrating a video processing apparatus according to an exemplary embodiment of the present invention. Referring to FIG. 2, a video processing apparatus 200 comprises a first de-interlacer 210, a scaler 220 and a second de-interlacer 230.

The first de-interlacer 210 adaptively performs de-interlacing by using spatial-temporal interpolation, thereby converting an SD-level 480$i$ video signal into a 480$p$ signal and outputting the 480$p$ signal.

The scaler 220 up-converts the 480$p$ signal into an HD-level 1080$i$ video signal and outputs the 1080$i$ video signal.

Preferably, the first de-interlacer 210 and the scaler 220 are integrated into a single chip having an MPEG decoder.

The second de-interlacer 230 performs de-interlacing with respect to the 1080$i$ signal received from the scaler 220 by using spatial interpolation, thereby converting the 1080$i$ signal into a 1080$p$ signal and outputting the 1080$p$ signal to an HD-level display device such as a 1080$p$ panel.

FIG. 3 is a flowchart illustrating a video processing method according to an exemplary embodiment of the present invention. Referring to FIG. 3, upon receiving an SD-level 480$i$ video signal, the first de-interlacer 210 adaptively performs de-interlacing by using spatial-temporal interpolation, thereby converting the 480$i$ video signal into a 480$p$ video signal and outputting the 480$p$ video signal at operation S310.

Generally, in accordance with an exemplary embodiment, spatial interpolation comprises one of three methods: line repetition, intra-field interpolation, and inter-field interpolation. The line repetition method simply repeats line information of a current field. The intra-field interpolation method inserts the average value of two lines of a current field between the two lines, thereby producing a new field. The inter-field interpolation method inserts the previous and next lines between lines of the current field, thereby producing a single frame.

Temporal interpolation is performed by inserting lines of a previous field and a next field between lines of a current field.

Spatial-temporal interpolation is called '3-D interpolation,' and extracts motion information between a previous field and a next field with reference to an incoming current field, adaptively combining an output by the spatial interpolation and an output by the temporal interpolation based on the extracted motion information, and outputting the combined output Thus, the first de-interlacer 210 performs de-interlacing by using a motion information-based adaptive interpolation, that is, spatial-temporal interpolation.

According to an exemplary embodiment of the present invention, interlacing by the motion-based spatial-temporal interpolation is performed by the first de-interlacer 120 one time only. Converting the 480$i$ signal into the 480$p$ signal causes a greater change in image than converting a 1080$i$ signal into a 1080$p$ signal. Since the spatial-temporal interpolation is performed based on motion, it is preferable that the first de-interlacer 210, which causes a greater change in image, perform the spatial-temporal interpolation.

The scaler 220 up-converts the 480$p$ signal into an SD-level 1080$p$ signal and outputs the 1080$p$ signal at operation S320. It is preferable that the first de-interlacer 210 and the scaler 220 are integrated into a single chip having an MPEG decoder.

Finally, the second de-interlacer 230 performs de-interlacing with respect to the 1080$i$ signal received from the scaler 220 by using spatial interpolation, thereby converting the 1080$i$ signal into a 1080$p$ signal and outputting the 1080$p$ signal at operation S330.

As discussed above, spatial interpolation comprises one of three methods: line repetition, intra-field interpolation, and inter-field interpolation. The line repetition method simply repeats line information of a current field. The intra-field interpolation method inserts the average value of two lines of a current field between the two lines, thereby producing a new field. The inter-field interpolation method inserts the previous and next lines between lines of a current field, thereby producing a single frame.

According to an exemplary embodiment of the present invention, preferably, the second de-interlacer 230 adopts the inter-field interpolation for spatial interpolation. Accordingly, the second de-interlacer 230 inserts previous and next lines in between lines of a current field.

According to another exemplary embodiment of the present invention, as described above, the first de-interlacer 210 performs de-interlacing by using motion-based spatial-temporal interpolation, whereas the second de-interlacer 230 performs de-interlacing by using spatial interpolation. The reason that interlacing via motion-based spatial-temporal interpolation is performed one time only is that a second de-interlacing operation would likely result in an artifact at a vertical edge of an image.

As described above, in order to convert the SD-level video signal into an HD-level video signal, de-interlacing by motion-based spatial-temporal interpolation is performed one time only and then de-interlacing by spatial interpolation is performed, which prevents an artifact from appearing at a vertical edge due to the two times interlacing operation by motion-based spatial-temporal interpolation.

The foregoing embodiments and advantages are merely exemplary and are not to be construed as limiting the present invention. The present disclosure can be readily applied to other types of apparatuses. Also, the description of the exemplary embodiments of the present invention are intended to be illustrative, and not to limit the scope of the claims, and many alternatives, modifications, and variations will be apparent to those of ordinary skill in the art.

What is claimed is:

1. A video processing apparatus comprising:
    a first de-interlacer to de-interlace a standard definition (SD)-level interlaced video signal into a SD-level progressive video signal by using spatial-temporal interpolation and output the SD-level progressive video signal;
    a scaler to convert the SD-level progressive video signal into a high definition (HD)-level interlaced video signal and output the HD-level interlaced video signal; and
    a second de-interlacer to de-interlace the HD-level interlaced video signal into an HD-level progressive video signal by using spatial interpolation and output the HD-level progressive video signal.

2. The video processing apparatus as claimed in claim 1, wherein the spatial interpolation comprises one of three methods: line repetition, intra-field interpolation, and inter-field interpolation, wherein the line repetition method repeats line information of a current field, the intra-field interpolation method inserts an average value of two lines of a current field between the two lines, thereby producing a new field, and the inter-field interpolation method inserts a previous line and a next line between lines of a current field.

3. The video processing apparatus as claimed in claim 1, wherein the spatial—temporal interpolation extracts motion information between a previous field and a next field with reference to a current field, adaptively combines an output by the spatial interpolation and an output by a temporal interpolation based on the extracted motion information and outputs the combined output.

4. The video processing apparatus as claimed in claim 3, wherein the temporal interpolation is performed by inserting lines of a previous field and a next field between lines of a current field.

5. The video processing apparatus as claimed in claim 1, wherein the first de-interlacer and the scaler are integrated into a single chip.

6. A video processing method comprising:
    de-interlacing an SD-level interlaced video signal into an SD-level progressive video signal by using spatial-temporal interpolation and outputting the SD-level progressive video signal;
    converting the SD-level progressive video signal into an HD-level interlaced video signal and outputting the HD-level interlaced video signal; and
    de-interlacing the HD-level interlaced video signal into an HD-level progressive video signal by using spatial interpolation and outputting the HD-level progressive video signal.

7. The video processing method as claimed in claim 6, wherein the spatial interpolation comprises one of three methods: line repetition, intra-field interpolation, and inter-field interpolation, wherein the line repetition method repeats line information of a current field, the intra-field interpolation method inserts an average value of two lines of a current field between the two lines, thereby producing a new field, and the inter-field interpolation method inserts a previous line and a next line between lines of a current field.

8. The video processing method as claimed in claim 6, wherein the spatial-temporal interpolation extracts motion information between a previous field and a next field with reference to a current field, adaptively combines an output by the spatial interpolation and an output by a temporal interpolation based on the extracted motion information and outputs the combined output.

9. The video processing method as claimed in claim 8, wherein the temporal interpolation is performed by inserting lines of a previous field and a next field between lines of a current field.

* * * * *

UNITED STATES PATENT AND TRADEMARK OFFICE
CERTIFICATE OF CORRECTION

PATENT NO. : 7,667,772 B2  Page 1 of 1
APPLICATION NO. : 11/312717
DATED : February 23, 2010
INVENTOR(S) : Hye-Hyun Heo It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1021 days.

Signed and Sealed this

Twenty-eighth Day of December, 2010

David J. Kappos
*Director of the United States Patent and Trademark Office*